(12) United States Patent
Dimov et al.

(10) Patent No.: US 8,842,878 B2
(45) Date of Patent: Sep. 23, 2014

(54) METHODS AND SYSTEMS FOR SOLAR SHADE ANALYSIS

(75) Inventors: Dmitry Dimov, Menlo Park, CA (US); Mark Alan Goldman, Menlo Park, CA (US)

(73) Assignee: Armageddon Energy, Inc., Menlo Park, CA (US)

( * ) Notice: Subject to any disclaimer, the term of this patent is extended or adjusted under 35 U.S.C. 154(b) by 171 days.

(21) Appl. No.: 13/139,986

(22) PCT Filed: Dec. 16, 2009

(86) PCT No.: PCT/US2009/068331
§ 371 (c)(1),
(2), (4) Date: Oct. 6, 2011

(87) PCT Pub. No.: WO2010/077993
PCT Pub. Date: Jul. 8, 2010

(65) Prior Publication Data
US 2012/0121125 A1    May 17, 2012

Related U.S. Application Data

(60) Provisional application No. 61/138,069, filed on Dec. 16, 2008.

(51) Int. Cl.
*G06K 9/00* (2006.01)
*G01W 1/12* (2006.01)
(52) U.S. Cl.
CPC *G01W 1/12* (2013.01); *Y02B 10/20* (2013.01); *Y02B 10/12* (2013.01); *Y02E 10/52* (2013.01); *F24J 2200/04* (2013.01)
USPC .......................................... 382/103; 382/100
(58) Field of Classification Search
None
See application file for complete search history.

(56) References Cited

U.S. PATENT DOCUMENTS 7,516,557 B2 *   4/2009   Courter .......................... 33/270
8,373,758 B2 *   2/2013   Guha et al. ................... 348/164
(Continued)

FOREIGN PATENT DOCUMENTS

| JP | 55024623 | 2/1980 |
| JP | S60220843 A | 11/1985 |
| JP | 2002062188 A | 2/2002 |

OTHER PUBLICATIONS

International Search Report and Written Opinion of International Application No. PCT/US2009/068331 mailed Jul. 30, 2010, 7 pages.

*Primary Examiner* — Nancy Bitar
(74) *Attorney, Agent, or Firm* — Perkins Coie LLP

(57) ABSTRACT

A device for performing solar shade analysis combines a spherical reflective dome and a ball compass mounted on a platform, with a compass alignment mark and four dots in the corners of the platform. A user may place the device on a surface of a roof, or in another location where solar shading analysis is required. A user, while standing above the device can take a photo of the device. The photographs can then be used in order to evaluate solar capacity and perform shade analysis for potential sites for solar photovoltaic systems. By using the device in conjunction with a mobile device having a camera, photographs may be taken and uploaded, to be analyzed and processed to determine a shading percentage. For example, the solar shade analysis system may calculate the percentage of time that the solar photovoltaic system might be shaded for each month of the year. These measurements and data, or similar measurements and data, may be valuable when applying for solar rebates or solar installation permits.

18 Claims, 16 Drawing Sheets

(56) References Cited

U.S. PATENT DOCUMENTS

| | | | |
|---|---|---|---|
| 2007/0150198 A1* | 6/2007 | MacDonald | 702/2 |
| 2007/0214665 A1* | 9/2007 | Courter | 33/270 |
| 2009/0049702 A1* | 2/2009 | MacDonald | 33/268 |
| 2010/0061593 A1* | 3/2010 | MacDonald et al. | 382/103 |
| 2010/0302363 A1* | 12/2010 | Mackenzie | 348/135 |

* cited by examiner

METHODS AND SYSTEMS FOR SOLAR SHADE ANALYSIS

CROSS-REFERENCE

This application claims the benefit of U.S. Provisional Application No. 61/138,069, filed Dec. 16, 2008, which application is incorporated herein by reference in its entirety.

BACKGROUND

There is a constant need for energy to power the growing energy consumption needs of our modern society. At present, fossil fuels are the main source of this energy but factors such as fossil fuel scarcity, resultant pollution from burning fossil fuels, and geopolitical factors that affect the price and availability of fossil fuels have resulted in a need for alternative sources of energy. An example of a popular form of an alternative energy source is solar energy.

In order to utilize solar energy, solar energy systems have been created and designed to harness received solar radiation into thermal or electrical energy through various means. These solar energy systems typically include a solar energy collector to collect the solar radiation and other components that may convert the collected solar radiation into either electrical or thermal energy.

These solar energy systems usually need to be designed and installed in locations and orientations with a significant or high solar radiation exposure in order to maximize the amount of solar radiation that may be collected by the solar energy systems. As a result, there is a need to measure the solar radiation access at a given location and orientation.

A number of systems that measure solar radiation may have limitations in their ease of use and accuracy. Some of the systems utilize chemical processes of film exposure to store captured images that may not be analyzed until the film is developed. Many have alignment problems that make it difficult to make accurate measurements. Further, devices may have limitations that include the lack of image calibration, the need to determine coordinates that uniquely identify the location of the device on the earth or region, the need to be left on-site for a long period of time, an inability to identify the skyline and open sky, and/or an inability to account for shading. In addition, the devices may be expensive to manufacture and/or use.

For example, the Solmetric SunEye and Wiley Electronics ASSET are specialized electronic devices that provide sophisticated shade analysis but are expensive, at $1,500 and $600 respectively at the time of filing of this application. The Solar Pathfinder is non-electronic and requires hand-tracing of a panoramic image reflected on a transparent dome on a paper template, and further processing of the result using a companion software package. In addition to high cost, many existing approaches and tools may require training and careful application, may require extra coordination such as keeping the device level with a compass arrow correctly aligned while attempting to press a button to take a picture, and may be difficult to use in actual field conditions such as on a sloped roof and in a bright sun.

What is needed are effective and efficient methods and systems of solar radiation measurement and solar shade analysis, improving upon or reducing the limitations described above.

SUMMARY OF INVENTION

The invention provides systems and methods for solar shading analysis. Various aspects of the invention described herein may be applied to any of the particular applications set forth below. The invention may be applied as a standalone solar shading analysis system or as a component of an integrated solution for solar applications. The invention can be optionally integrated into existing businesses and processes seamlessly. It shall be understood that different aspects of the invention can be appreciated individually, collectively or in combination with each other.

In one embodiment, the device may include a fish-eye lens for capturing a fish-eye photograph, a compass for pointing the device to magnetic south when capturing the photograph, and a bubble level for leveling the device so that it is level when facing up. The fish-eye lens, the compass and the bubble level may be attached to a platform with an adhesive backing and placed over the lens of a built-in camera of a mobile phone. When the fish-eye photographs are captured, they may be analyzed and compared to sun path diagrams to calculate shading percentages at a particular location.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the present invention are not described with reference to any particular processor, programming language, machine code, etc. It will be appreciated that a variety of programming languages, machine codes, etc. may be used to implement the teachings of the invention as described herein.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

Some of the features of the invention are described as set forth in the following figures and description. A better understanding of the features and advantages of the invention will be obtained by reference to the following detailed description that sets forth illustrative embodiments provided in accordance with the invention.

DETAILED DESCRIPTION OF INVENTION

In the following detailed description, numerous specific details are set forth in order to provide a thorough understanding of the invention. However it will be understood by those of ordinary skill in the art that the invention may be practiced without these specific details. In other instances, well-known methods, procedures, and components have not been described in detail so as not to obscure the invention. Various modifications to the described embodiments will be apparent to those with skill in the art, and the general principles defined herein may be applied to other embodiments. The invention is not intended to be limited to the particular embodiments shown and described.

In order to more accurately predict the expected output of a solar photovoltaic system, shade analysis tools can be used. Solar shade analysis (also known as solar availability analy-sis) may also be required for a solar photovoltaic system to qualify for certain incentive rebates and tax credits. For example, the California Solar Initiative (CSI) requires that installers of solar photovoltaic systems provide the percentage of time the system might be shaded for each month of the year. As described in further detail below, embodiments of the present invention may create an image of objects on the horizon line, and then compare it with sun path diagrams, to determine what percentage of the sun path might be obstructed in a given month.

An aspect of the invention provides a solar shading (solar availability) analysis system which can be easily assembled from mass-market components at a relatively low cost and be used with nearly any mobile phone or mobile device that has a built-in digital camera. Thus, the approach may include a simple and inexpensive hardware component and an online software component. This solar shading analysis device may interact with an online software component and be utilized by a user with minimal instruction. For example, the user may only have to follow a few simple steps. The approach may have a high degree of accuracy and a low chance of user errors compared to other methods, and may be used by a broad audience of users with no special training. Analyzing solar availability may include analyzing sun paths as well as shading of spaces and calculating ratios of areas that are unobstructed from the sun to areas obstructed from the sun, or ratios of solar irradiation for an unobstructed sky area to total available solar irradiation for a given location.

Figure 1:
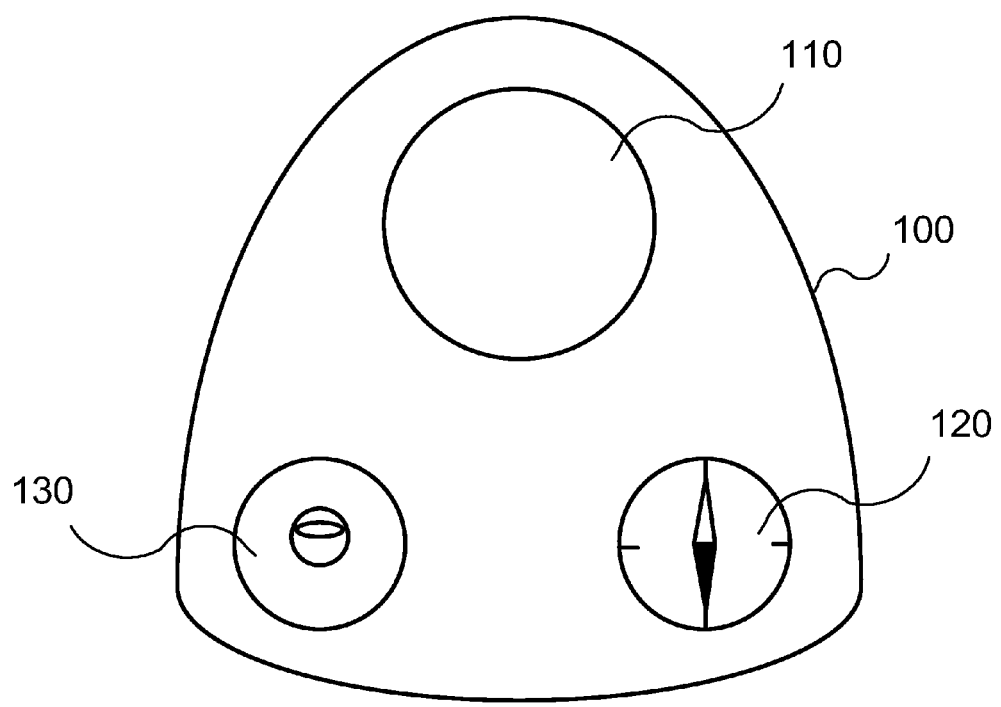
FIG. 1 shows an example of a bird's eye view of the solar shading analysis device with a fish-eye lens, bubble level and compass on a platform, in accordance with a first embodiment of the invention.

Referring to FIG. 1, in a first embodiment, the solar shading analysis device may include a fish-eye lens 110 that is placed on a platform 100. The fish-eye lens may be made of plastic or some other material. A level 130, such as a bubble level, may also be placed on the platform 100. Further, the platform 100 may also hold a compass 120. The platform may also be made of plastic and have some kind of adhesive backing. FIG. 1 shows one embodiment of the solar shading analysis device from a bird's eye view.

Figure 2:
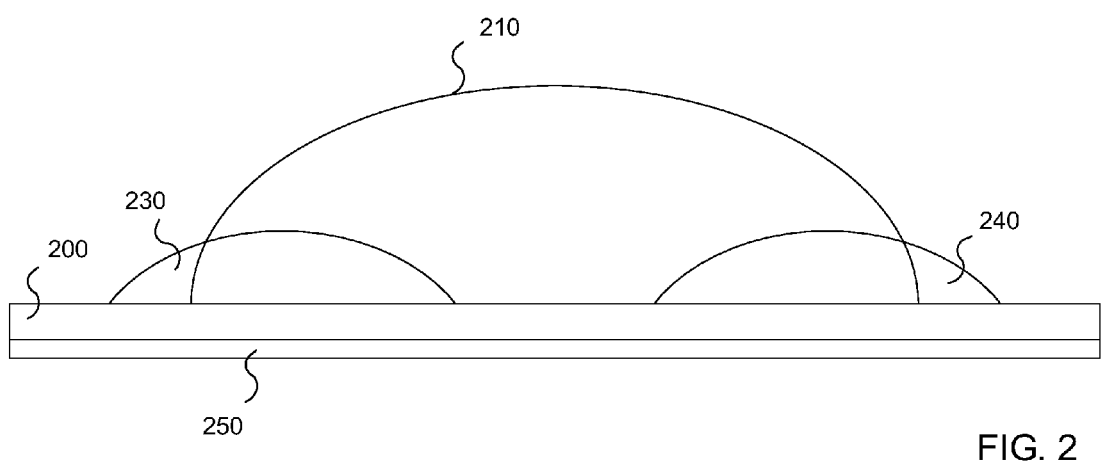
FIG. 2 shows an example of a side view of the solar shading analysis device, in accordance with a first embodiment of the invention.

FIG. 2 shows one example of a side view of a first embodiment of the solar shading analysis device. A fish-eye lens 210, a level such as a bubble level 230 and a compass 240 may be included and placed on a platform 200. As can be seen in FIG. 2, the platform 200 may have some kind of adhesive backing 250.

Figure 3:
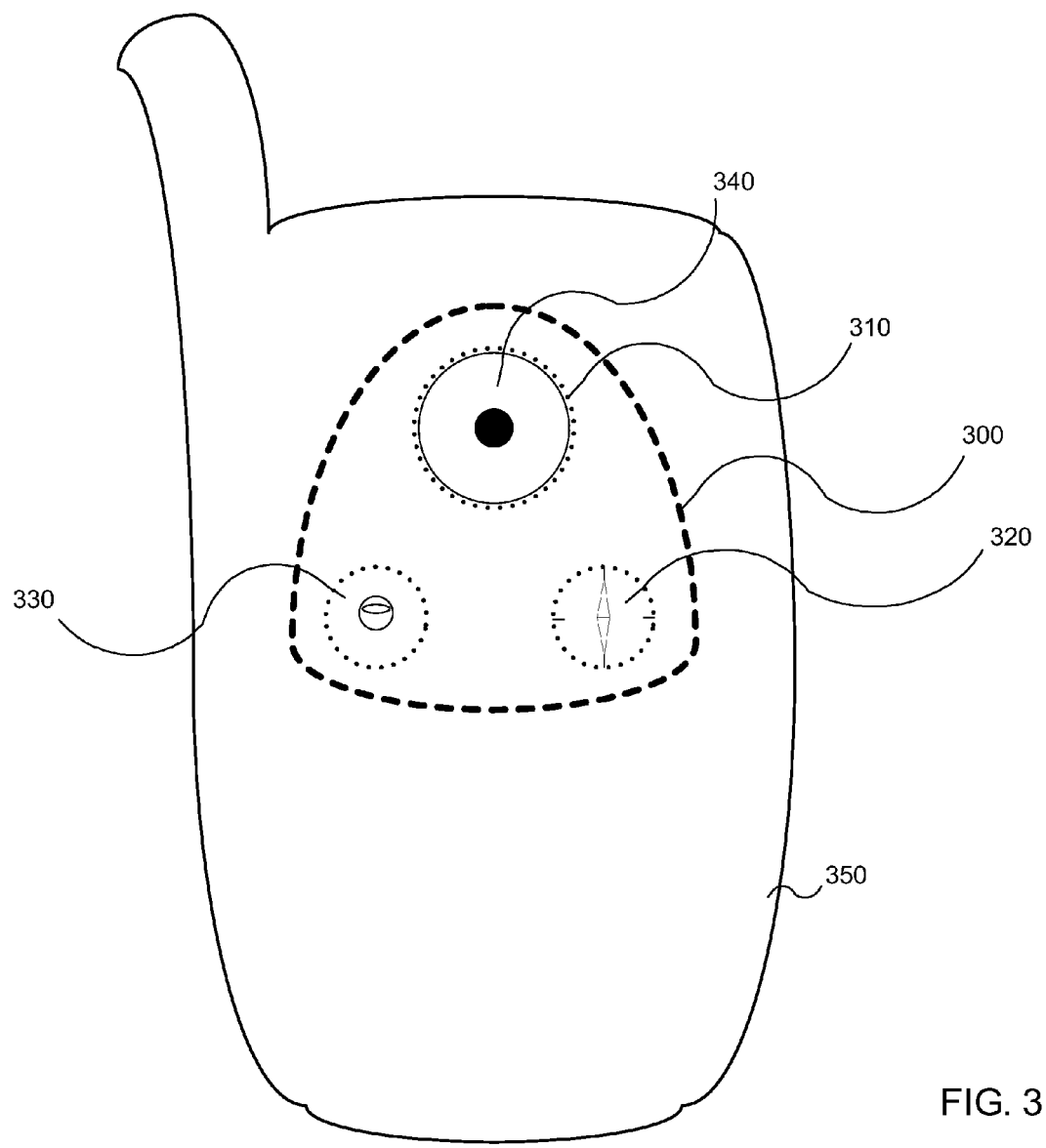
FIG. 3 shows an example of the solar shading analysis device placed over a built-in camera of a mobile device, in accordance with a first embodiment of the invention.

Referring to FIG. 3, the solar shading analysis device may be placed over the lens of a built-in camera 340 of a mobile phone (or other device with a camera) 350. The user could make sure that the vertical axis of the device is lined up with the vertical axis of the mobile phone 350. The platform 300 with an adhesive backing would be secured over the mobile phone 350. The fish-eye lens 310, the level 330, and compass 320 may be as described with reference to FIG. 1 and FIG. 2, and may be on top of platform 300 of the solar shading analysis device.

In a first embodiment, a user could, using the mobile phone or other device 350 in picture shooting mode, place the mobile phone 350 near a location that requires shade analysis, with the device facing up. The user would want to line up the bubble in the bubble level 330 such that the bubble is in the center of the bubble level 330, and the user would also want to line the compass 320 up such that the device is pointing to the magnetic south. When the user has adjusted the device such that the compass 320 and the level 330 line up accordingly, the user may take a picture with the built-in camera 340.

Figure 4A:
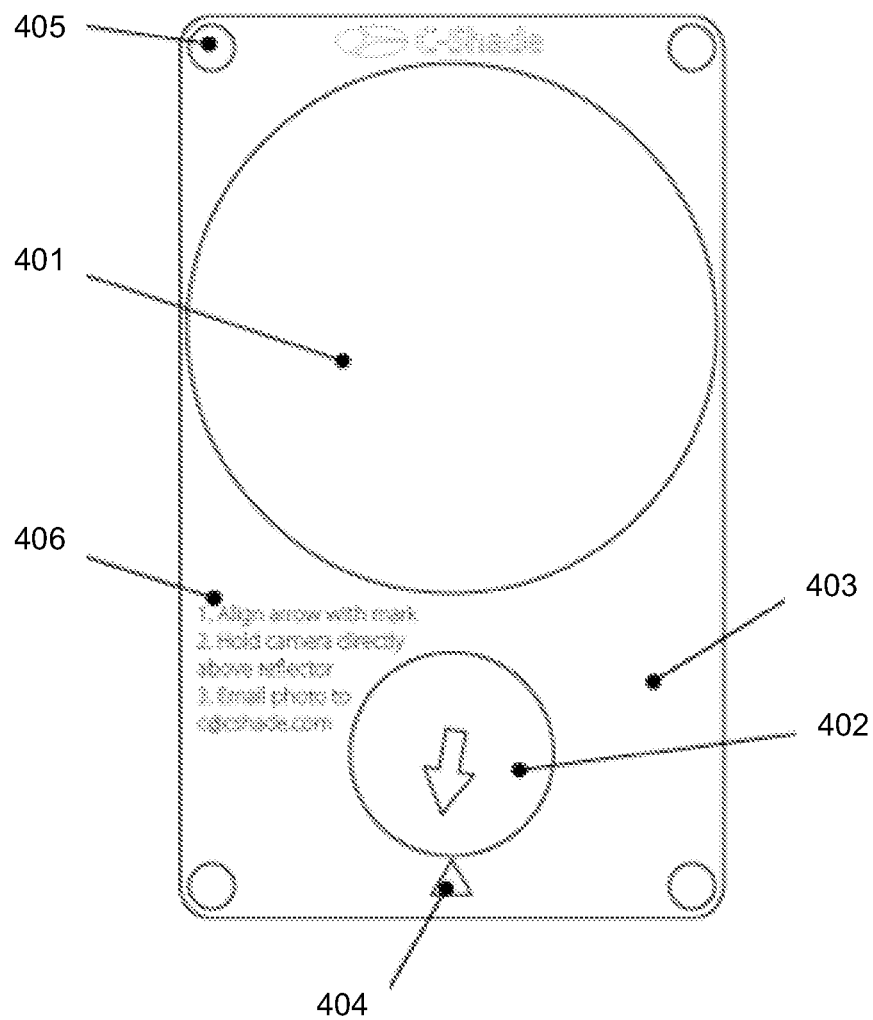
FIG. 4A illustrates an example of a top view of a solar shading device, in accordance with a second embodiment of the invention.
Figure 4B:
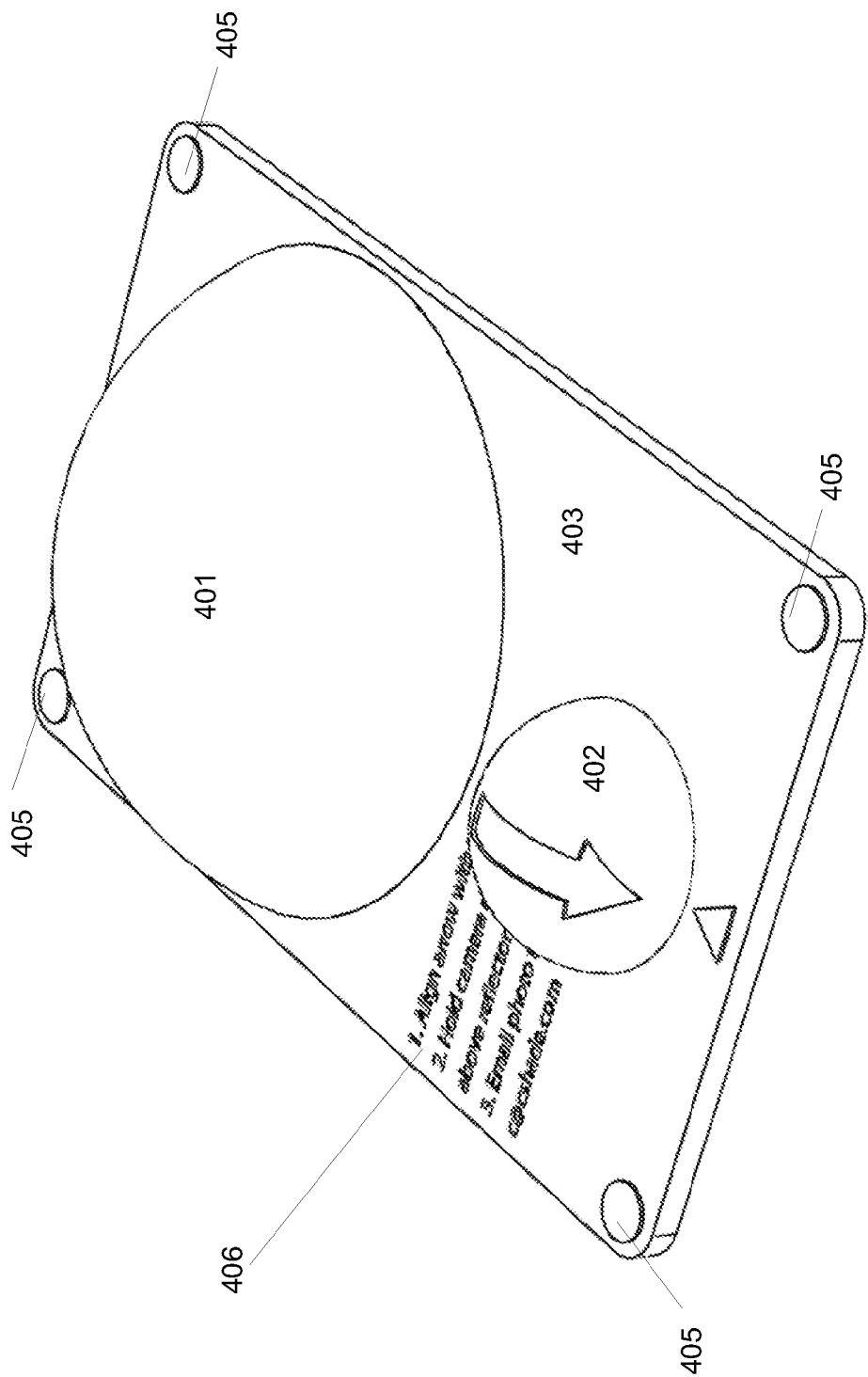
FIG. 4B illustrates a three-dimensional view of a solar shading device, in accordance with a second embodiment of the invention.

In a second embodiment, as shown in FIGS. 4A and 4B, the solar shading device may include a reflective dome (or globe) 401 (which may be spherical or round) and a ball compass 402 mounted on a rectangular platform 403. The reflective dome 401 may be a convex dome mirror and may reflect images at a wider angle and thus provide a wide angle view. The solar shading device may have a compass alignment mark 404 and four markers (e.g., red dots) which may be positioned in corners of the platform 405, and may include short instructions for how to use the device 406. The solar shading device may be used in conjunction with a mobile phone or other device with a camera that is capable of sending and receiving multimedia messages over the Internet, Multimedia Messaging Service, or any network capable of reaching the Internet. The mobile phone or other device with a camera may communicate with a server computer with software that may perform image analysis and solar availability calculations. FIG. 4B illustrates a three-dimensional view of a second embodiment of the solar shading device.

Figure 5:
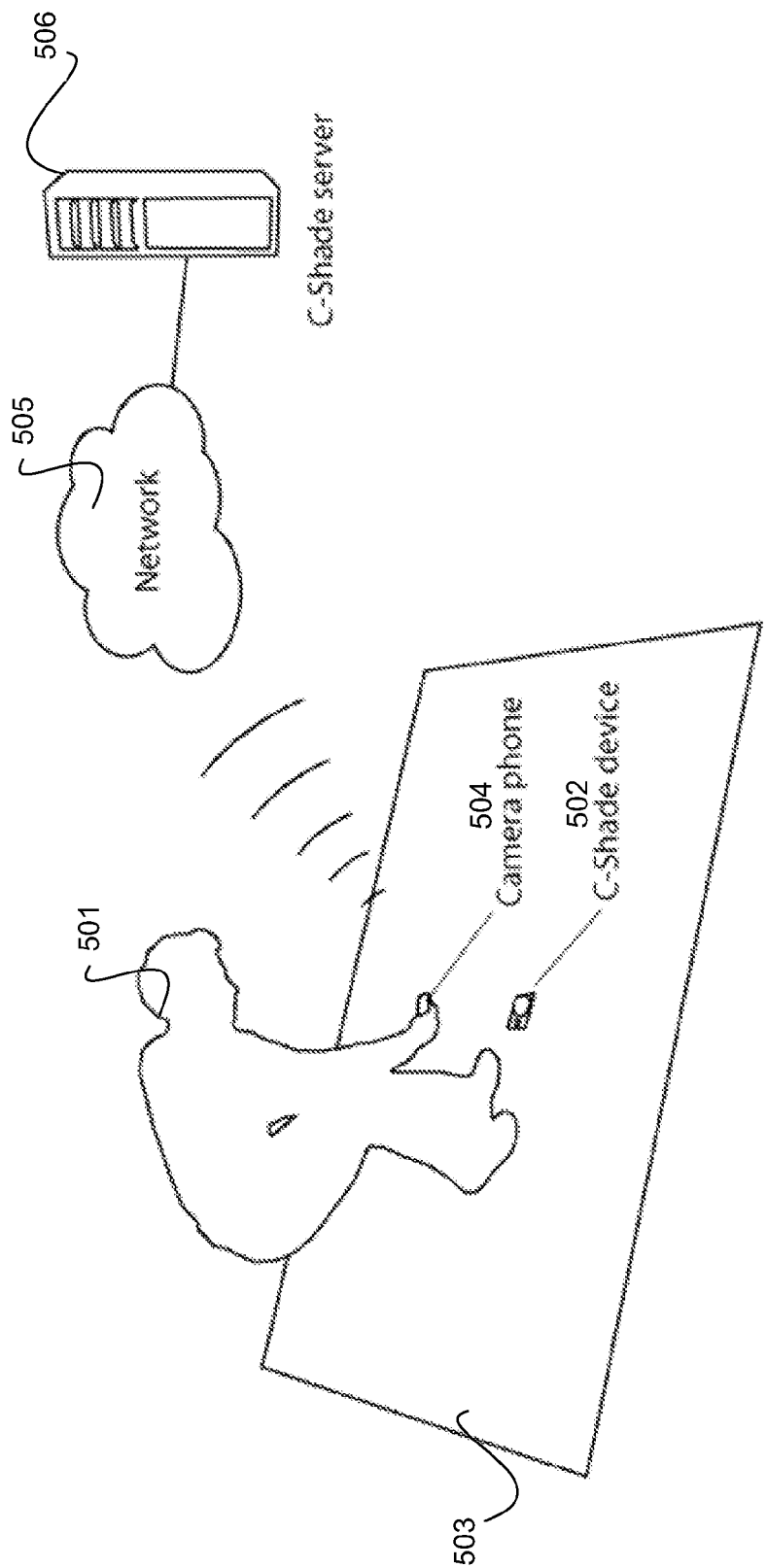
FIG. 5 illustrates an example of a user's interaction with a second embodiment of the solar shading device, in accordance with an embodiment of the invention.

Referring to FIG. 5, one embodiment of a user's interaction with a second embodiment of the solar shading device is shown. A person using the device 501 may place the solar shading device 502 on the surface of a roof 503, or in another location where solar shading analysis is required. The device 502 may be oriented so that the compass arrow is pointing in the general direction of the mark and towards the user 501. The user 501, while standing above the device 502 and keeping the camera phone 504 directly above the device 502, may take a photo of the device 502.

In order to accurately calculate solar availability using the solar shading device 502, the camera must be level and as close as possible to directly above the device 502 such that a plumb line from the camera lens would go through the center of the device. The natural sense of balance of the user will keep the user's body positioned so that the camera will be close to the required position if the user is instructed to keep the device centered in the image. For additional accuracy, a small leveling device such as a bubble level may be used to ensure the camera is level.

To ensure that the image of the user taking the picture does not affect the solar availability calculations, the user may stand such that the compass arrow points to the user while at the same time approximately aligned with the mark. In this way, the image of the user may appear in the image only on the North side (for Northern hemisphere) and out of the part of the image used for solar availability calculations.

After taking a picture using one of the embodiments of devices described above, the user may send the picture via email or MMS or by any means of communication from the device to an online component of the solar shading analysis system. The user 501 may send the photo via email, MMS, or similar mechanism (over a network 505) to a predefined address recognized by a server 506. If camera phone is not GPS enabled, the user's zip code or postal code of the location may be included in the message. The server 506 may receive the message, extract the location of the photo using either the GPS information in the photo or the user supplied zip or postal code in the message.

Using image recognition, the server may determine the tilt and orientation of the device, the direction of the compass arrow, and the unobstructed sky area in the dome reflection. In addition, the obstructed area in the dome reflection may be determined. Based on this information, the server may construct a response that may include the surface tilt, azimuth, and average solar availability for the location for the year and for each month of the year. For example, a response message may be as follows: Image taken on Oct. 19, 2009 16:41:51 using Apple iPhone 3G Location: 37.7428 N 122.4708 W
Magnetic declination: 14.44 degrees
Surface tilt: 17 degrees, azimuth 157 degrees
Average Solar Availability 31%

| Month | Solar Availability |
| --- | --- |
| January | 56% |
| February | 69% |
| March | 51% |
| April | 21% |
| May | 18% |
| June | 40% |
| July | 25% |
| August | 18% |
| September | 39% |
| October | 67% |
| November | 67% |
| December | 38% |

Solar availability may also be presented as a ratio of the size of the unobstructed sky area to the obstructed sky area. The user may receive a response message within seconds of sending the image. The user may immediately use the information in the response to make a decision of the suitability of the location for a solar installation, or review the information later, for example for use in submitting paperwork for solar rebates.

Figure 6:
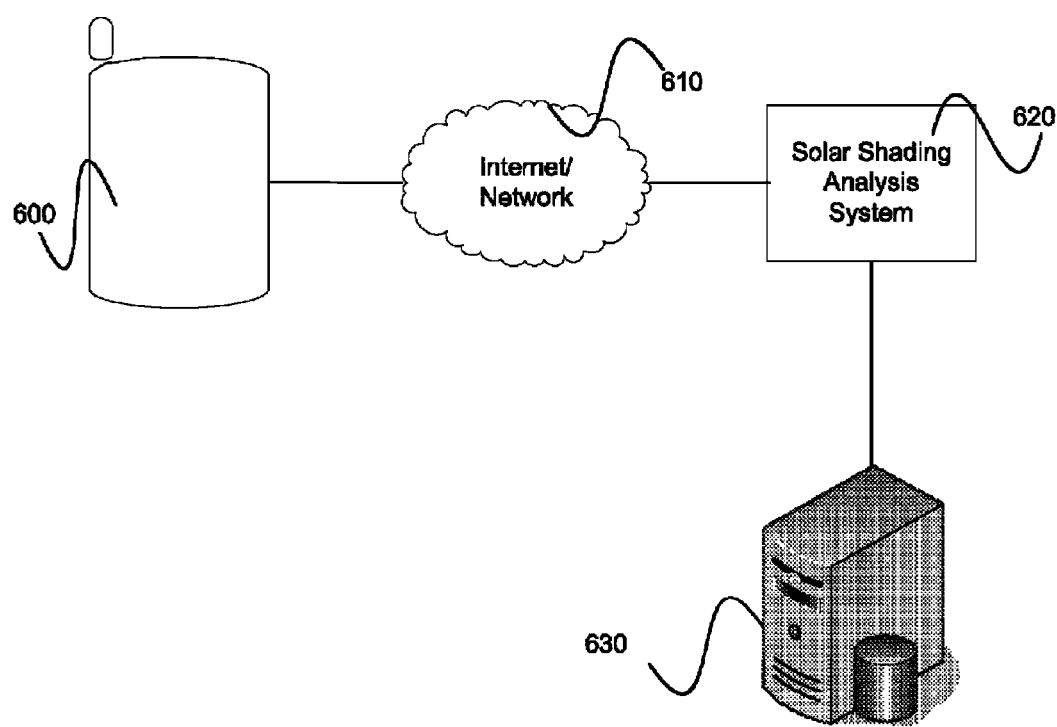
FIG. 6 shows one example of the architecture of the solar shading analysis system within a network, in accordance with an embodiment of the invention.

FIG. 6 illustrates an example of the architecture of the overall system, in accordance with an embodiment of the invention. As shown in FIG. 6, the user may take a picture with the mobile phone coupled with the solar shading analysis device 600, and then send it to the solar shading analysis system 620 via the Internet 610. The solar shading analysis system 620 may have an online user interface or some other interface (which may or may not be hosted on a network) that may be accessed by the user. By using information from the mobile phone coupled with the solar shading analysis device 600, the geographic location of the site may be determined. One skilled in the art will recognize that methods for determining a person's location by using information from their mobile device are well known in the art, and any of those well known methods may be employed here.

Figure 7:
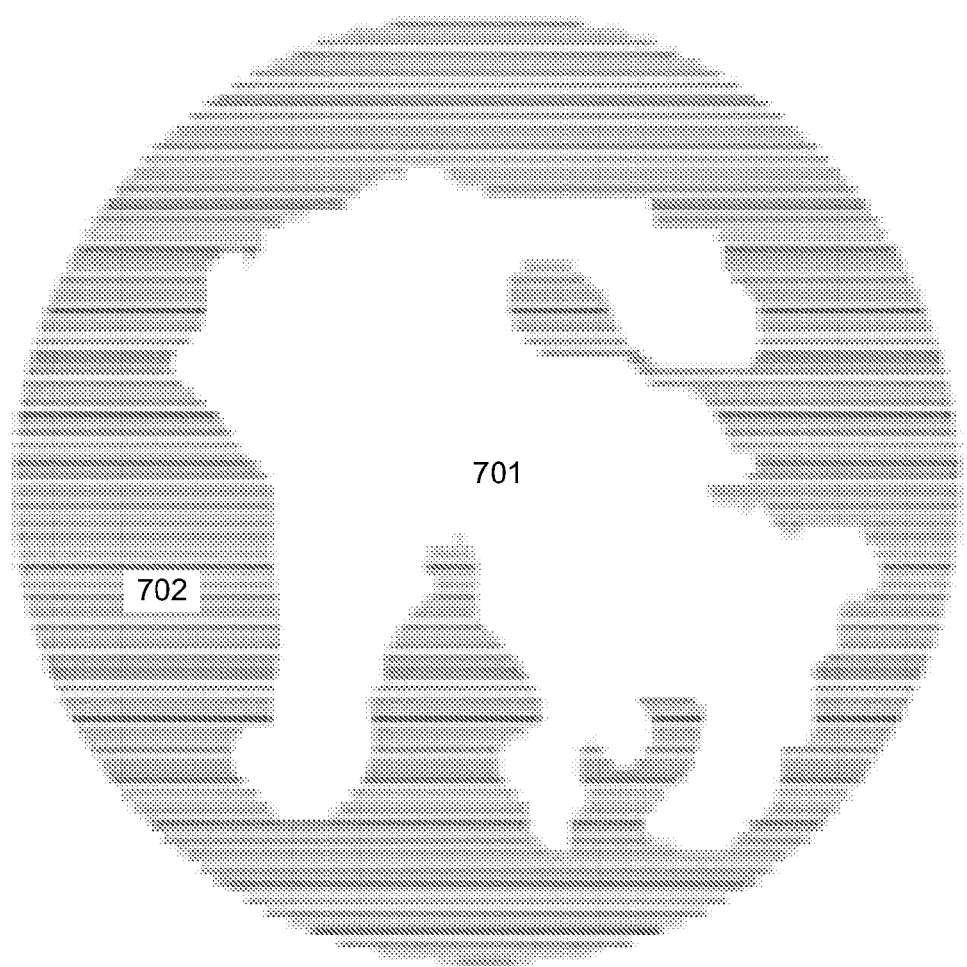
FIG. 7 shows an example of a fish-eye photograph taken with the solar shading analysis device, in accordance with an embodiment of the invention.
Figure 8:
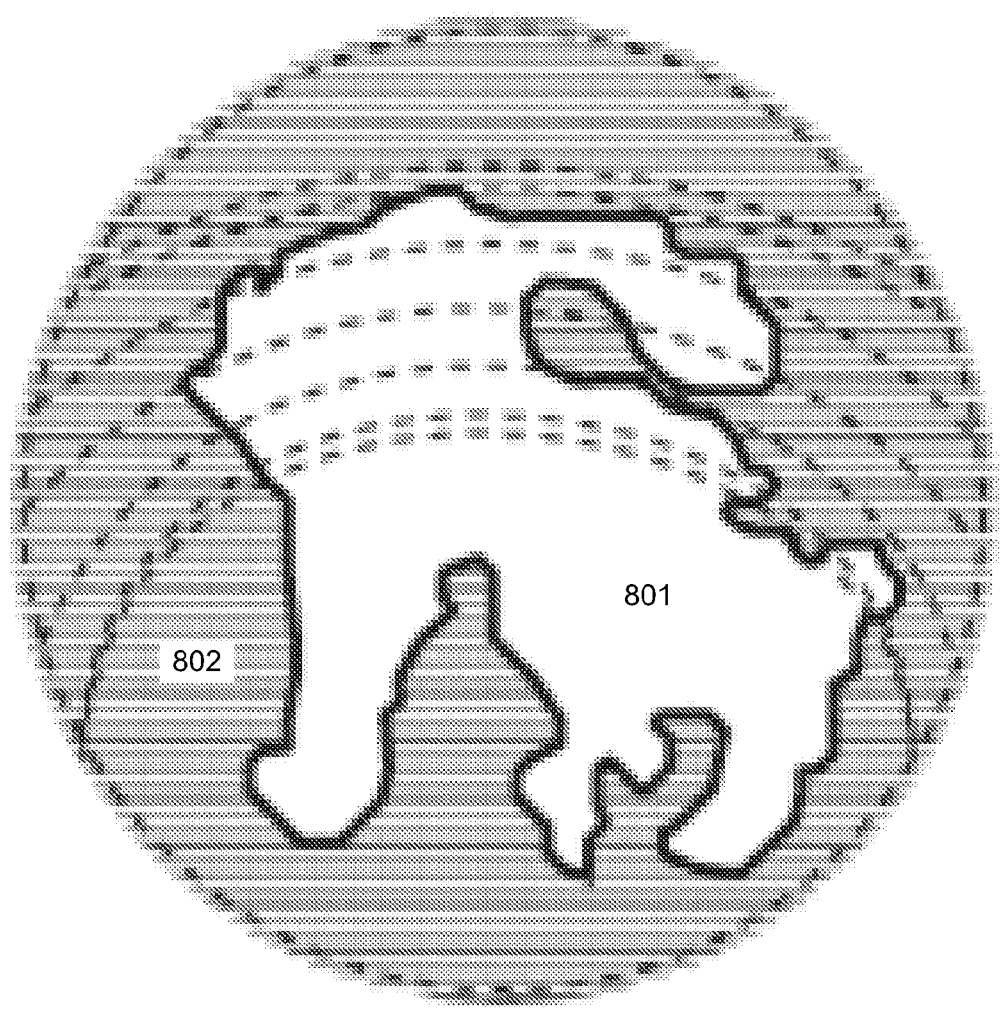
FIG. 8 shows an example of a sun path diagram, in accordance with an embodiment of the invention.

The solar shading analysis system 620 may be connected to a computer/server and/or database 630 and may digitally analyze the picture sent via the Internet 610 from the device 600, and calculate a shading percentage. The solar shading analysis system 620 may make use of the user's geographic location to calculate magnetic inclination and determine a sun path. Relevant sun path diagrams (such as in FIG. 8) may be compared to the fish-eye photographs (as can be seen in FIG. 7) to determine the shading percentages or other data or results. As shown in FIGS. 7 and 8, a size of a white portion of the image 701, 801 represents unobstructed sky and can be compared to a size of a shaded portion of the image 702, 802 which represents the obstructions to determine a relative proportion of the unobstructed sky to the obstructions. The results produced from the solar shading analysis system 620 may be sent in a response message to the user's mobile device 600, stored online for later access via a separate interface, or both.

By using the solar shading analysis system 620, the user may perform relatively efficient and cost effective shade analysis for each location that requires shade analysis. The user may later log into a website and access the solar shade analysis system 620 via a web interface to review the shade analysis data. The user may also use the shade analysis data for a solar rebate application or a solar installation permit, for example.

The types of data and measurements that may be calculated and determined by the solar shade analysis system may be included in a solar analysis data report. Such solar analysis data report may include the magnetic declination associated with the site, an identifier such as a zip code or address or certain coordinates identifying the location of the site, and site analysis information. The report may include the months, the solar exposure capacity for the site as a percentage exposure, and solar radiation for the site, as well as an energy value for the site. Solar capacity may range in values between 0 and 100 where higher values of solar capacity may reflect an increased suitability of the site for solar energy generation. Based upon the evaluation, adjustments may be made to the site and area or solar photovoltaic systems in order to adjust the solar exposure capacity. It will be appreciated that the types of data and measurements, or content of the solar analysis data reports, are not limited to the examples as described herein, but may include other types of information and data.

The location of the site may be determined by conventional methods. For example, if the mobile device contains a global positioning sensor (GPS), then the latitude and longitude of the site may be easily determined. Other methods for determining or approximating the longitude and latitude of a location with respect to mobile devices may also be employed.

The solar analysis system may operate to provide estimates of solar energy capacity for the site and facilitate site adjustments to increase the opportunity for solar energy generation at the site. By using the photograph taken by the solar shade analysis device (for example, the fisheye photograph as shown in FIG. 7), along with sunpath diagrams (for example, as shown in FIG. 8), the system may calculate and determine how much sunlight and solar energy a certain location or site would receive. For example, the system may take a fisheye photograph to evaluate how many hours of direct sun that a part of a site would receive, using methods similar to those described by the Pacific Gas and Electric Company at http://www.pge.com/mybusiness/edusafety/training/pec/toolbox/tll/sunpath.shtml, which is hereby incorporated by reference. Thus, the image of objects on the horizon line (as can be seen in FIG. 7) may be compared with sun path diagrams (for example, as shown in FIG. 8) to determine what percentage of the sun's path might be obstructed in a given month.

In one embodiment, the server may reside in a network accessible location and may be capable of being addressed via a designated email address, an MMS short code, or another such mechanism, and can receive and send messages. In one embodiment, the server may receive an incoming message from a user that includes the image of the device taken on location to be measured. The server may determine if the image includes GPS information and may use it to determine the location to be measured. Otherwise, the server may extract the zip code or postal code included in the message. The server may apply image processing to locate the four red dots of the device in the image. The dots may be located using color filters or other image recognition techniques such as cluster processing. The server may use the dimensions of the device to constrain and optimize the identification of the dots.

Figure 9:
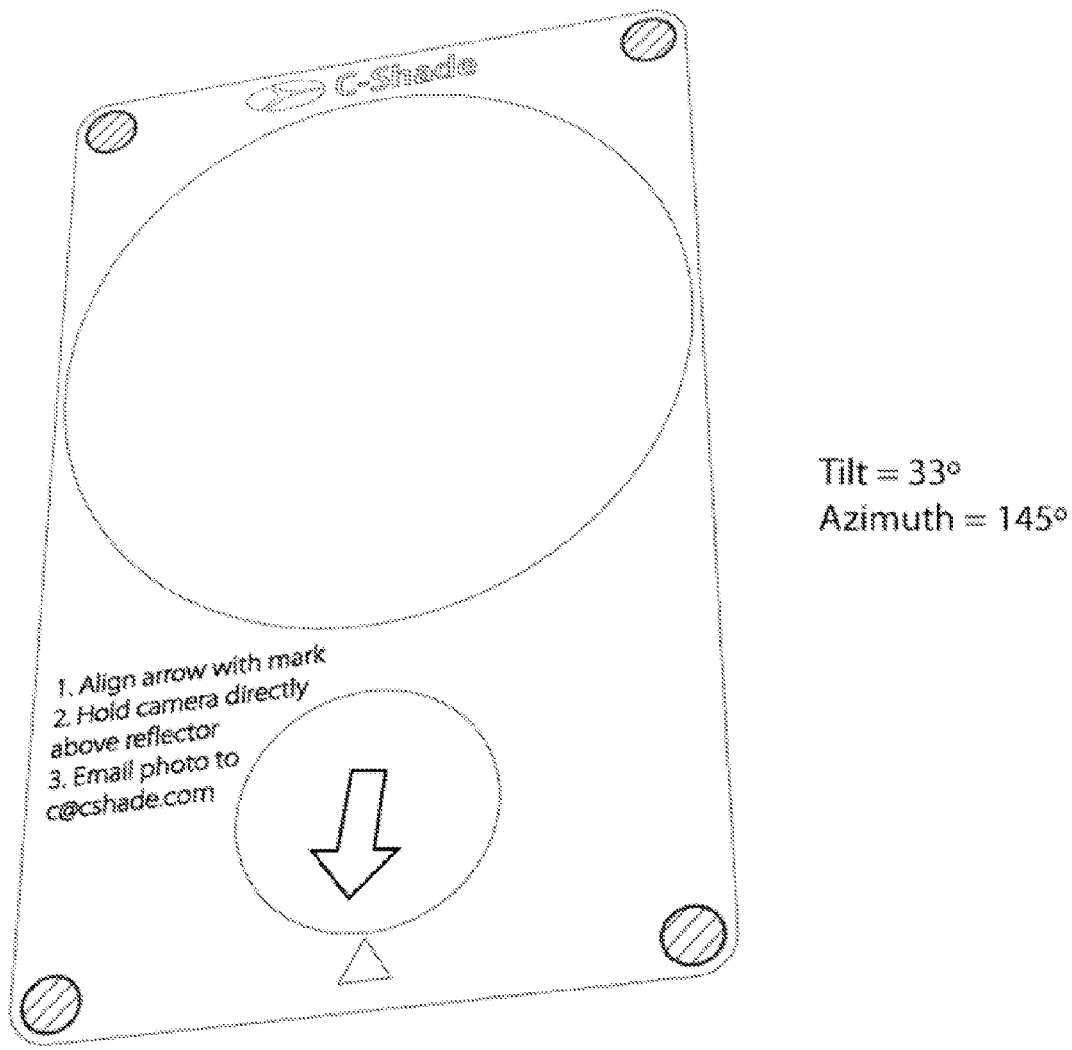
FIG. 9 illustrates an example of perspective distortion which may be captured in an image, in accordance with an embodiment of the invention.

After the markers (dots) are identified, the server may use the perspective distortion of the image of the device to determine its tilt relative to the image plane and the direction of the tilt relative to the vertical axis of the image. This may be accomplished using trigonometry calculations, numerical iterative methods to modify the distorted image until it matches a proper rectangle, combination thereof, or other similar methods. FIG. 9 shows and example of the perspective distortion.

Figure 10:
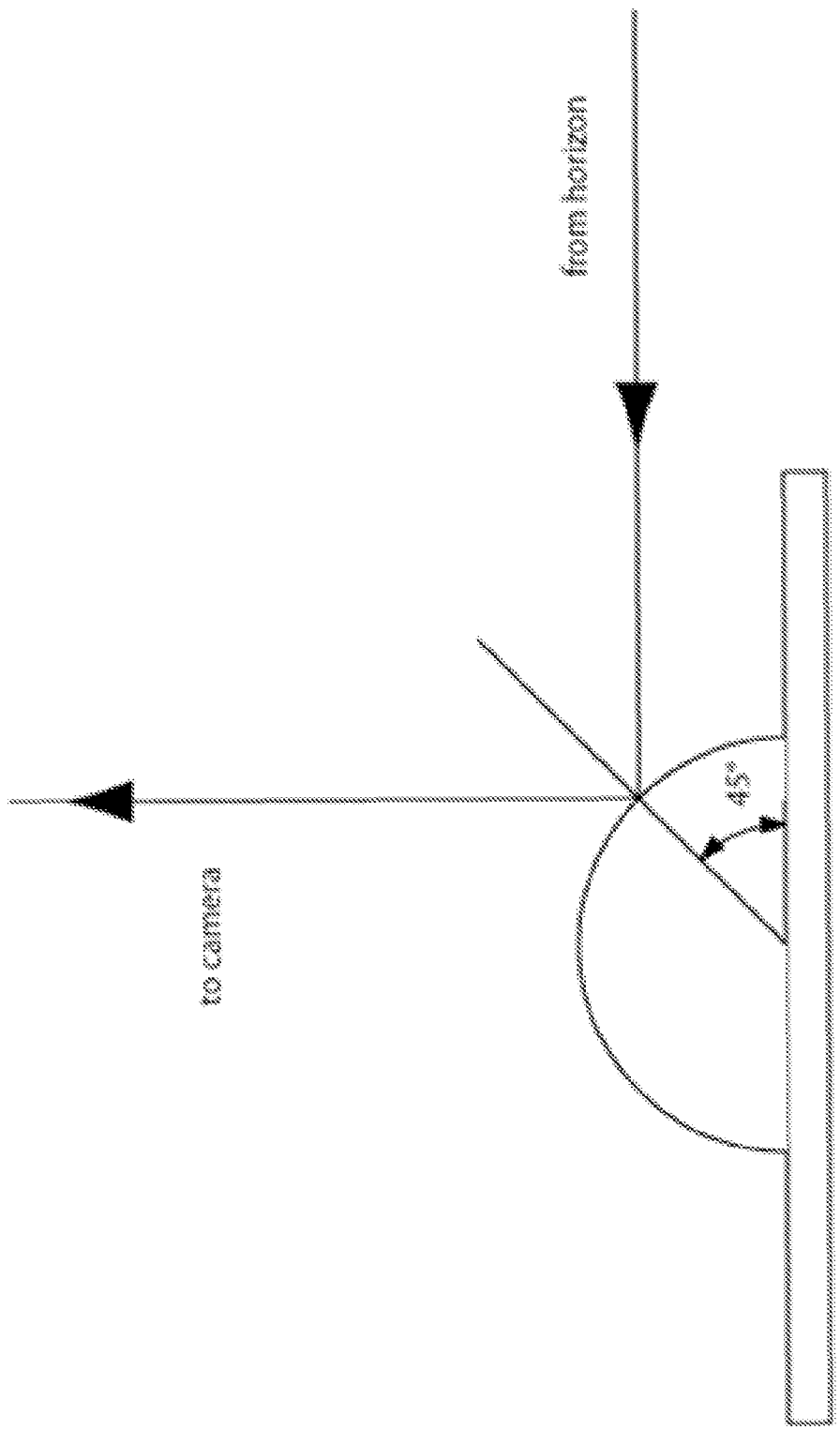
FIG. 10 illustrates a calculation used to determine a circle that is bound by an image of sky above the horizon, in accordance with an embodiment of the invention.

Once the tilt and orientation of the image of the device are determined, the server may determine the locations of the ball compass and the reflective globe. The server may apply image recognition using pattern matching, cluster analysis, or other approaches to determine the direction of the compass arrow. The direction of the compass may be taken to be the direction towards the magnetic North at the location to be measured. The server may extract the image of the sky from the reflective globe using its position (tilt and orientation) determined above to locate the portion of the sky line image above the horizon. Referring to FIG. 10 below, one example of a calculation used to determine the circle that will completely bound the image of the sky above the horizon is shown. For example, the area may be located within the distance $d=R \cos(45°) =0.707R$ from the center of the reflective globe, where R is its radius.

Figure 11:
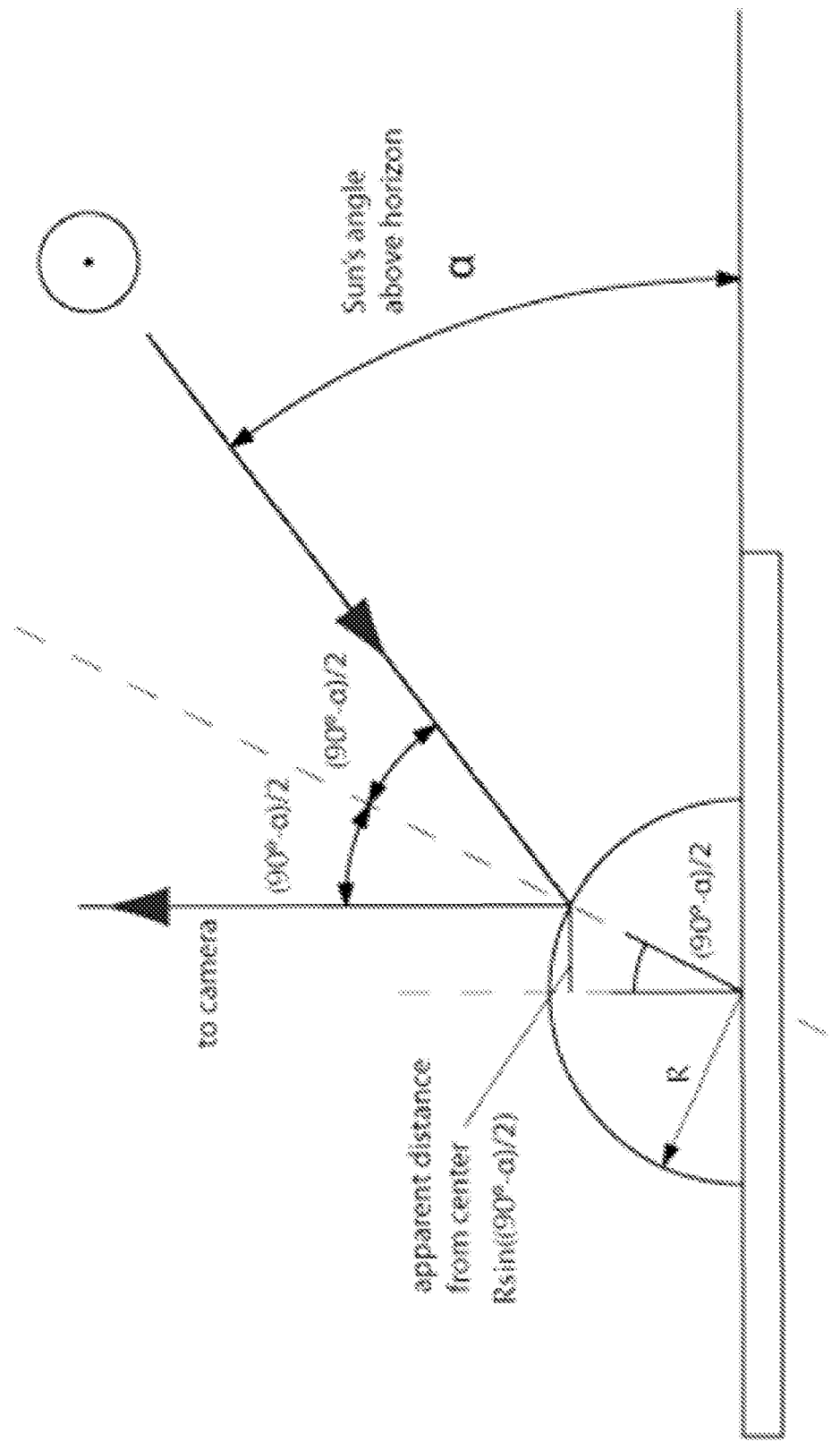
FIG. 11 illustrates angle calculations that may be made for a reflection off of the reflective dome (globe), in accordance with an embodiment of the invention.

The image of the sky may be analyzed to determine the unobstructed sky area. This may be done using image processing algorithms such as cluster analysis using the Lab color space and using information available in the Lightness and a and b channels of the Lab color space, or other image processing techniques. The server may use the location information (e.g., obtained from GPS) to determine the magnetic declination and therefore the direction to true North. Using well-known methods, such as the solar position calculation library available from NREL (http://rredc.nrel.gov/solar/codes_algs/solpos/), the server may calculate the position of the sun in the sky and determine the sun's azimuth and elevation above the horizon for any day of the year, and the average trajectory across the sky for every month of the year. The server may rely on angle calculations for the reflection off the solar shading device's spherical reflective globe illustrated in FIG. 11.

Figure 12:
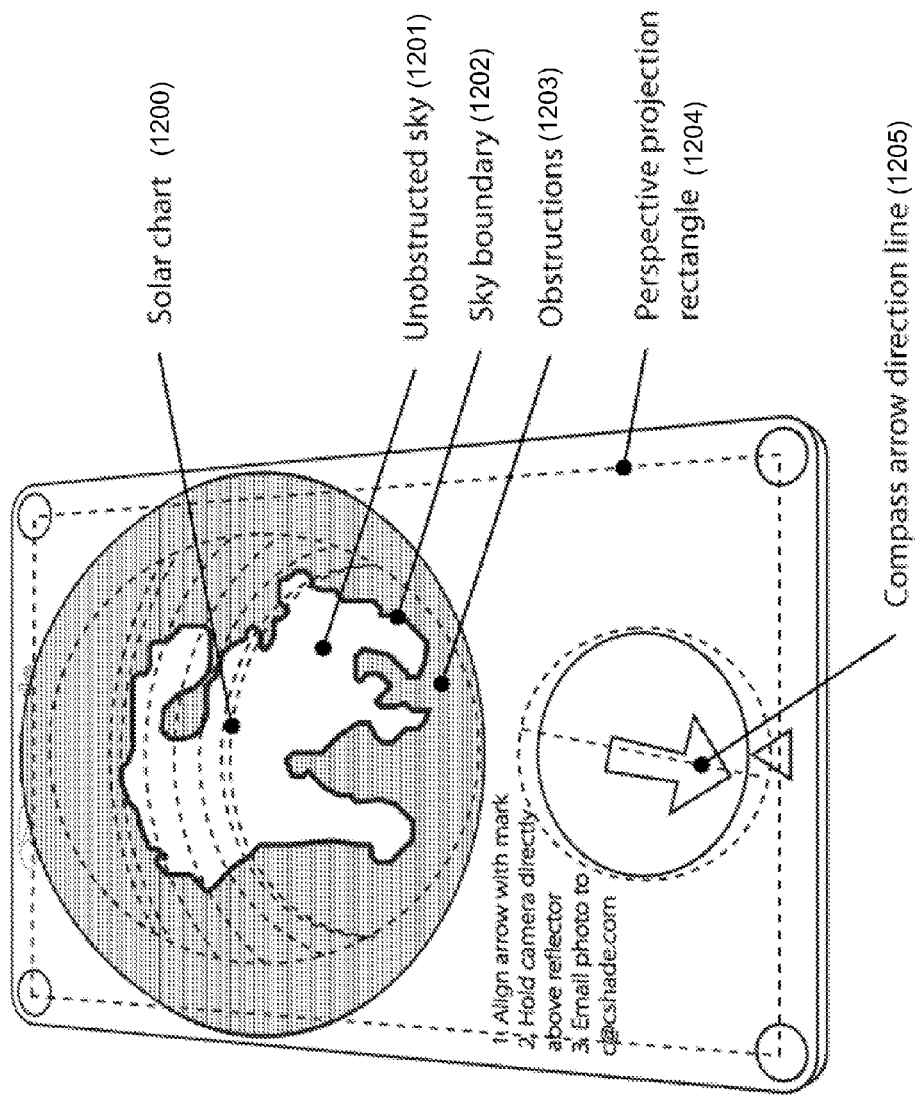
FIG. 12 illustrates an example of a processed image demonstrating a sun chart overlaid onto an extracted sky image, in accordance with an embodiment of the invention.

The server may draw the sun's trajectory for every month of the year over the image of unobstructed sky extracted earlier using image processing algorithms. The portion of the trajectory within the unobstructed sky area may be considered as exposed to sun at that point in time, and the portion outside the unobstructed sky area may be considered as shaded and not receiving sunlight for the period of time represented by that portion of the trajectory. The example processed image in FIG. 12 demonstrates the sun chart 1200 overlaid onto the extracted sky image. In FIG. 12, the extracted sky image shows the unobstructed sky 1201, the sky boundary 1202, as well as the obstructions represented by the gray area of the image 1203. The tilt of the device may be calculated by determining the perspective projection rectangle 1204 of the image that is sent to the server and transforming it until it is no longer distorted. The compass arrow direction line 1205 indicates the orientation of the device.

The server may use the information about unobstructed portions of the sun's path across the sky for each month for this location in conjunction with tables of total available solar irradiation for this location to determine solar availability percentage for this location. Total available solar irradiation may be obtained using a clear sky insolation method such as the one proposed by R. Brooks (http://www.pages.drexel.edu/~brooksdr/DRB_web_page/Solar/InsolationInstructions.htm), solar irradiation data from the National Solar Database, or other such sources.

For each month of the year, the server may calculate the ratio of solar irradiation for the unobstructed portion of sun's trajectory for that month to the total available solar irradiation for that location, in order to produce the percentage value of solar availability for that month, and may produce the solar availability report for each month of the year. The server may also report average yearly solar availability by calculating the ratio of solar irradiation for unobstructed sun trajectories for all months to total solar irradiation for the year. The server may include these values to create a response to the user as described earlier. Although the most common approach in the trade is to calculate monthly averages, the server may use daily sun's path to achieve higher accuracy.

The server may send a report to the user that may include the monthly and yearly average solar availability, as well as surface tilt and azimuth, a detailed report of solar availability for the location with hourly or quarter-hourly data, and a processed image illustrated above for visual verification by the user. The server may include any other data that may be derived from the information above.

Because all of the hardware components of the solar shading analysis device are accessible, and can be inexpensive and mass-produced, the solar shading analysis may be more cost-effective than other solutions for performing shade analysis.

Figure 13:
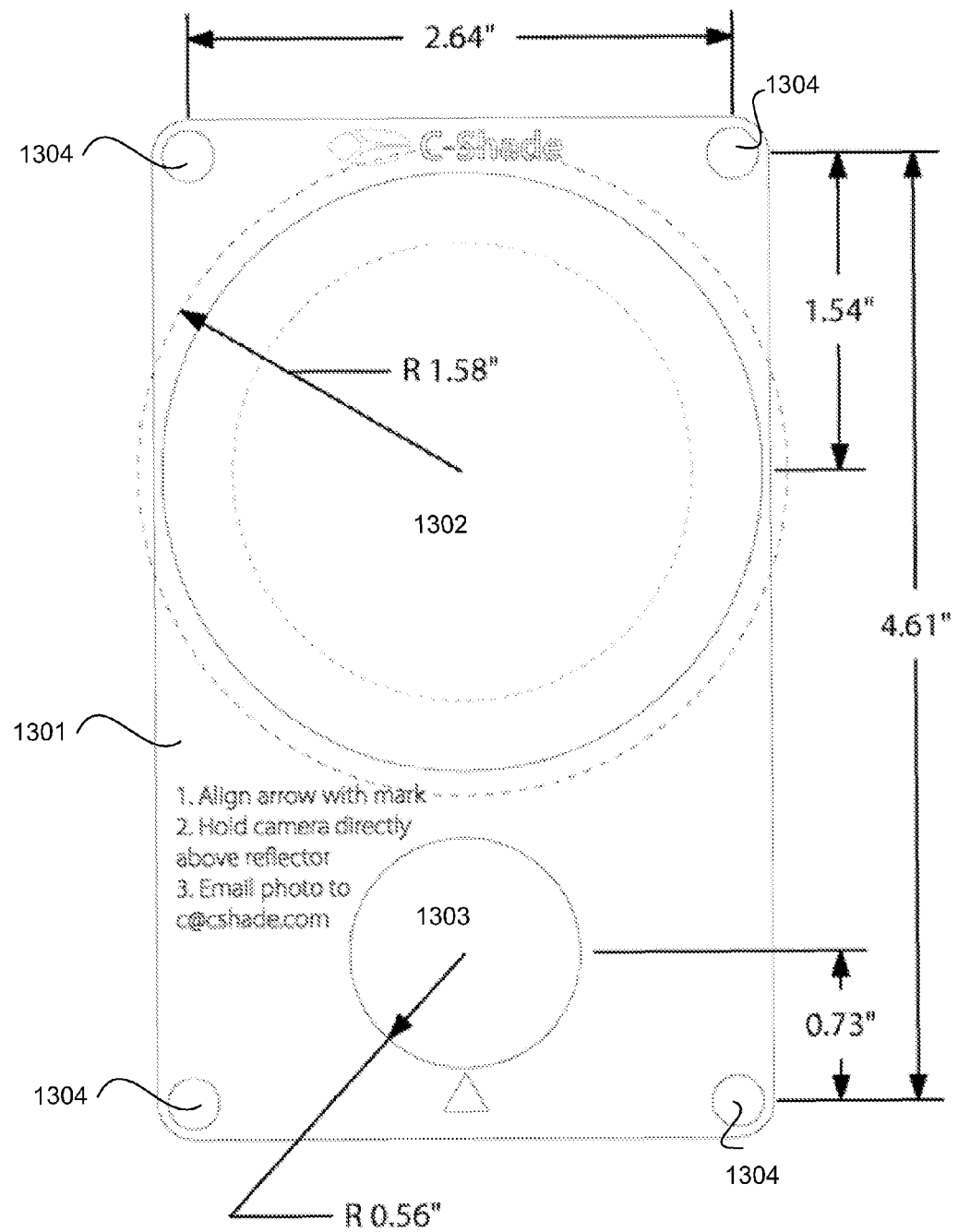
FIG. 13 illustrates an example of an implementation of a solar shading device, in accordance with an embodiment of the invention.

For example, dimensions of one example of an implementation of the solar shading device are shown in FIG. 13. It should be understood that embodiments of the invention are not limited to the specific dimensions shown, and the server software can be easily adjusted to handle devices with sizes different from those shown, for example to handle a small key chain version of the device.

As shown in FIG. 13, a rectangular platform 1301 may be made from plastic, such as ⅛" thick sheet of acrylic or ABS. The platform 1301 may be colored white to increase the overall lightness of the image, reduce image exposure, and improve the image quality of the sky area that is normally very bright; and may include a gray mark in order to provide a gray calibration point for image processing software. The reflective globe 1302 may be made from a plastic sphere with a reflective coating. The ball compass 1303 may be a magnetized sphere with an arrow suspended in liquid inside a transparent spherical container, and may be similar to those used in key chains or automotive compasses. It may be inserted into a round opening in the platform. For use in the Northern hemisphere, when the device is properly positioned the compass arrow of compass 1303 must point away from the reflective globe 1302 and towards the mark. For Southern hemisphere, the direction of the arrow must be reversed. Four red dots 1304 may have the diameter of ¼" and be made from self-adhesive felt to reduce glare, or may be made by making a spherical or conical depression in the plastic platform and painted with red paint, also to reduce glare.

Figure 14A:
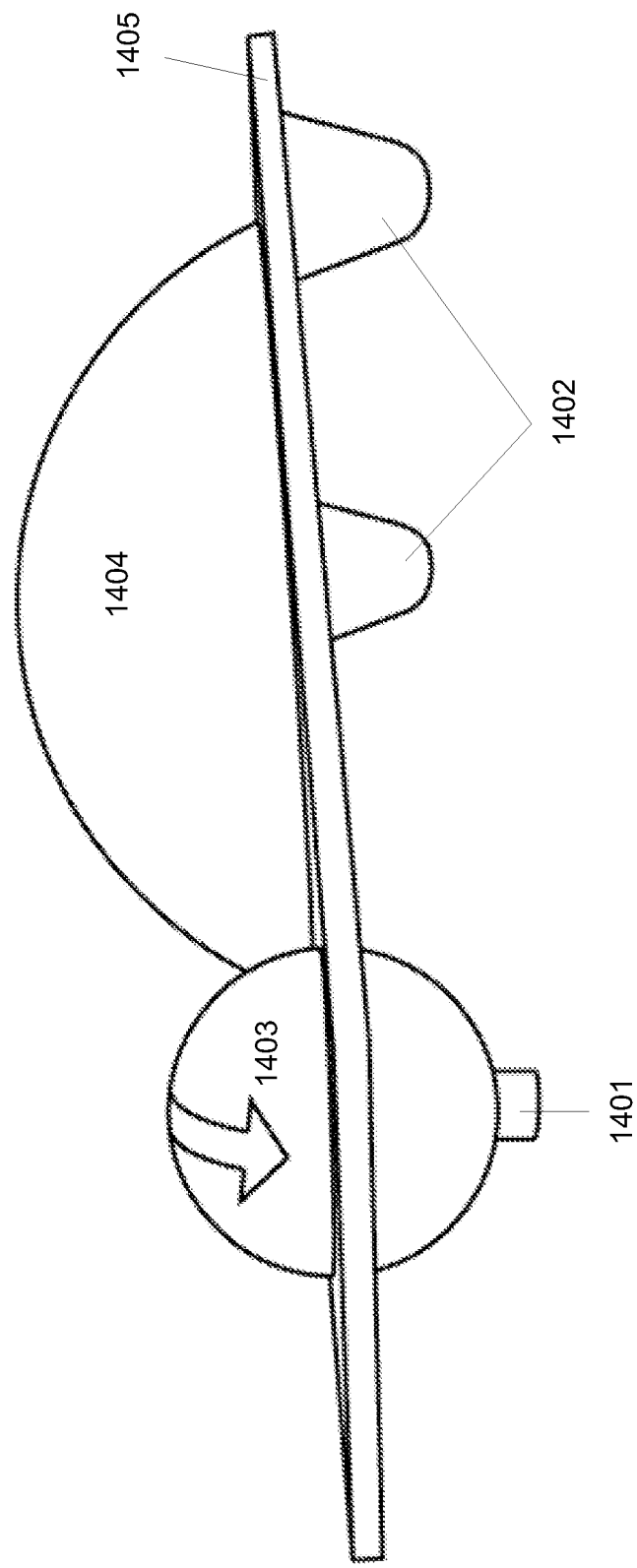
FIGS. 14A and 14B illustrate side views of an implementation of a solar shading device, in accordance with an embodiment of the invention.
Figure 14B:
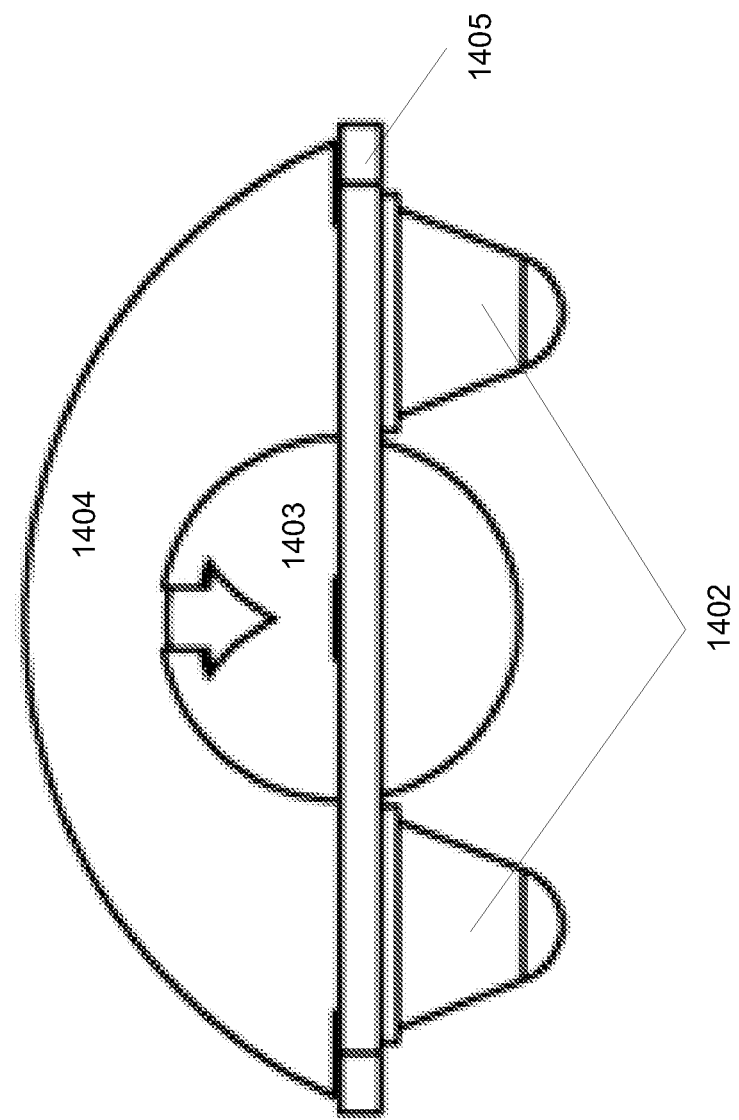

Referring to FIG. 14A, a three dimensional side view of a device is shown. In FIG. 14B, a side view from the top of the device is shown. The device may have three feet 1401, 1402 for stable positioning on the surface to be measured. The bottom of the ball compass protruding below the plastic platform 1401 may be used as one of the three feet, and there may be two other feet 1402 attached to the bottom of the platform close to the top side of the device. On the top side of the device, there may be a compass 1403 and a reflective dome 1404. The server software may utilize the four red dots to locate the device during image processing, and the platform 1405 may be of any shape, with rounded corners, round, hexagonal, etc.

Further, the solar shading analysis device as described herein can be used with many mobile phones with built-in cameras, including other types of devices as described. One skilled in the art will recognize that the embodiments of the invention are not limited to the mobile phones as described, but other devices such as digital cameras, PDAs, laptops, etc. may be implemented. Most camera phones in wide use are suitable for use with solar shading device. The mobile camera should be capable of taking a photo, sending the photo via email, MMS, or another way into the network to a predefined address, optionally entering zip or postal code, and receiving a response message that can be displayed to the user. If the camera includes GPS capability and tags the photos with location information, entering zip or postal code would not be necessary.

Alternatively, it is possible to use any camera, transfer the image to any networked computer, and send the image from the computer using email or a similar method. The response may be sent by a server to the sender's address and may be accessed from the networked computer or any other device capable of retrieving electronic messages.

In addition, use of the device and shading analysis system would not require specialized software on the mobile phone or device, and would instead rely on a standard and widely available capability of taking and emailing a photograph. Further, use of the device and system would not require any specialized training, and users could follow very simple instructions. In addition, any online component of the solar shading analysis system may be upgraded and improved, without affecting the end users of the system. For example, sophisticated features such as image editing may be added without requiring upgrades of the hardware device or the mobile phone.

There are many advantages of the solar shading device as described herein. The device contains no electronics or precision components, and can be fabricated very inexpensively from widely available materials. Other solutions may require complex electronics components or consumables such as sun charts. In addition, the device can be used with nearly any mobile phone with a built-in camera. The device also requires no specialized software on the mobile phone and relies instead on standard and widely available capability of taking and sending a photo. Users need not have access to a desktop or laptop computer and can receive results in seconds on location. Other solutions may require synchronization with a computer. Further, the methods as described require no specialized training. Users need to follow simple instructions that can be provided directly on the device.

In addition, because the compass arrow position is determined using image recognition, the arrow need not be perfectly aligned. In other systems, imperfect compass arrow alignment introduces errors into results. The device may also require no leveling. Other solutions rely on leveling, which adds complexity and increases the chance of errors. The roof tilt and azimuth may be determined automatically. In other solutions, tilt and azimuth are determined in a separate step, increasing complexity and a chance of errors. The location may be determined automatically from GPS information if the camera phone is GPS-enabled. Other solutions require a GPS add-on or manual location entry. Further, a server software component can be upgraded and improved without affecting the end users. Sophisticated features, such as image editing, can be added without requiring upgrades of the hardware device or the mobile phone.

Other advantages are that the device may be compact and lightweight and can be made in a variety of sizes so it fits in a pocket or be carried on a keychain. The reflective globe has a spherical shape and can be easily produced. Other solutions that use reflective globes rely on precision parabolic shapes. In addition, all the information is automatically stored on the server and can be accessed at a later time if necessary for further analysis.

All concepts of the invention may be incorporated or integrated with other systems and methods for solar radiation measurement or solar shading analysis, including but not limited to those described in U.S. Patent Publication No.

2007/0150198 A1 (MacDonald) published on Jun. 28, 2007 and U.S. Patent Publication No. 2007/0214665 A1 (Courter) published on Sep. 20, 2007, which are hereby incorporated by reference in their entirety.

Further, all concepts of the invention may be incorporated or integrated with other systems and methods for solar shading analysis, including Solmetric SunEye described at http://www.solmetric.com/suneye.html, Wiley Electronics Acme Solar Site Evaluation Tool (ASSET) described at http://www.we-llc.com/ASSET.html, and the Solar Pathfinder described at http://www.solarpathfinder.com/PF-TC?id=wCfvM57a, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An apparatus comprising:
    a spherical reflective dome having a reflective coating on the spherical reflective dome forming a convex mirror for reflecting an image of sky;
    a compass for pointing the apparatus to magnetic north; and
    a platform, wherein the platform is marked with markers for indicating a tilt of the apparatus relative to an image plane of an external camera when an image of the apparatus is captured by the external camera;
    wherein the apparatus contains no electronics and wherein the image reflected from the apparatus is to be captured the external camera over the apparatus for determining solar availability at a particular location by utilizing the image reflected from the apparatus to analyze the image of sky and calculate a ratio of solar irradiation for an unobstructed sky area for a given month to total available solar irradiation for a location of the apparatus.

2. The apparatus as in claim 1, wherein the spherical reflective dome is comprised of a plastic sphere with the reflective coating.

3. The apparatus as in claim 1, wherein the compass is a ball compass.

4. The apparatus as in claim 3, wherein the ball compass is a magnetized sphere with an arrow suspended in liquid inside a transparent spherical container.

5. The apparatus as in claim 1, wherein the platform includes an opening for inserting the compass.

6. The apparatus as in claim 1, wherein the markers are made from self-adhesive felt to reduce glare.

7. The apparatus as in claim 6, wherein the markers are placed in a depression in the platform and painted to reduce glare.

8. A mobile device comprising:
    a camera for capturing a photograph of a solar shading device, forming a convex mirror, containing no electronics, wherein the photograph includes an image of sky reflected from a spherical reflective dome of the solar shading device and an orientation indicator on the solar shading device;
    an interface configured to enable a user standing over the solar shading device to take the photograph, via the camera, of the solar shading device to determine solar availability at a location and tilt of the solar shading device and
    wherein the mobile device is configured to send, via a wireless network, the photograph to a computer server for processing the photograph to perform solar shading analysis by extracting the image of sky from the photograph and analyzing the image of sky and to receive and present a response message from the computer server, the response message including a calculated ratio of solar irradiation for an unobstructed sky area for a given month to total available solar irradiation for the location,
    wherein the response message includes a surface tilt of the solar shading device relative to an image plane of the camera when the photograph is taken.

9. The mobile device as in claim 8, wherein the photograph of the orientation indicator includes an image of a compass and markers for indicating tilt of the solar shading device.

10. The mobile device as in claim 8, wherein the mobile device is capable of sending and receiving multimedia messages over the wireless network to the computer server.

11. The mobile device as in claim 8, further comprising a GPS for capturing the location of where the photograph is captured; and wherein the mobile device is configured to send the location to the computer server.

12. The mobile device as in claim 8, wherein the mobile device is configured to send a postal code supplied by the user to the computer server.

13. The mobile device as in claim 8, wherein the response message further includes an azimuth of the location, and average solar availability of the location for a year and for each month of the year.

14. A method for performing solar shading analysis comprising:
    receiving an input message from a mobile device, the input message including a photograph of an image of sky reflected off of a spherical reflective dome forming a convex mirror on a solar shading device, the solar shading device and containing no electronics;
    determining a location from the input message received from the mobile device;
    determining a tilt of the solar shading device from relative positions of identifiable markers in the photograph, wherein the tilt is relative to an image plane of a camera that captured the photograph;
    determining a direction of the tilt relative to a vertical axis of the photograph;
    determining an unobstructed sky area and an obstructed sky area from the image by extracting the image of sky from the photograph and analyzing the image of sky;
    providing a response message to the mobile device including the tilt and average solar availability at the location; and
    calculating a ratio of solar irradiation for the unobstructed sky area for a given month to total available solar irradiation for the location.

15. The method as in claim 14, wherein the solar shading device is positioned on a surface such that a compass arrow on the solar shading device is pointing towards magnetic north.

16. The method as in claim 15, further comprising applying image recognition to determine a direction of the compass arrow on the solar shading device.

17. The method as in claim 14, wherein the unobstructed sky area is determined using cluster processing.

18. The method as in claim 14, wherein analyzing the image sky includes analyzing using cluster analysis.

* * * * *